Dec. 3, 1968    S. C. PEEK, JR    3,414,768
SEMICONDUCTOR BALLAST FOR DISCHARGE LAMP
Filed Jan. 3, 1966
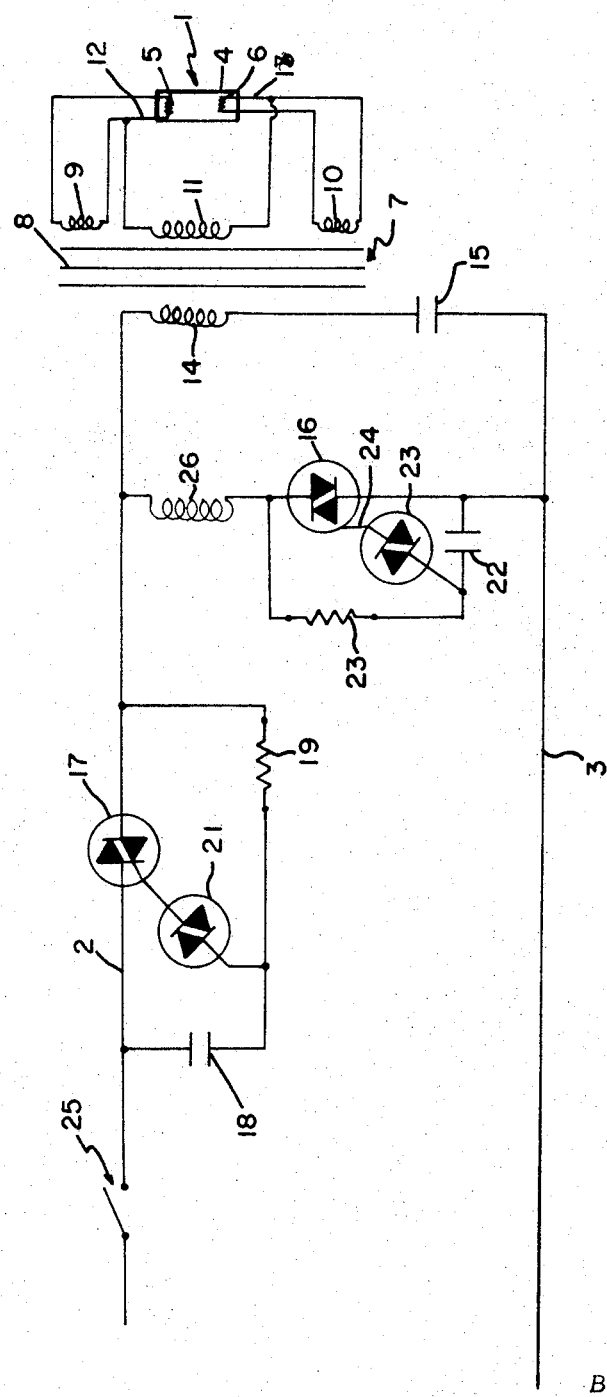
SANDFORD C. PEEK JR.
*INVENTOR.*
BY *Laurence Burn,*
ATTORNEY

United States Patent Office 3,414,768
Patented Dec. 3, 1968

3,414,768
SEMICONDUCTOR BALLAST FOR
DISCHARGE LAMP
Sandford C. Peek, Jr., Ipswich, Mass., assignor to Sylvania Electric Products Inc., a corporation of Delaware
Filed Jan. 3, 1966, Ser. No. 520,037
6 Claims. (Cl. 315—240)

ABSTRACT OF THE DISCLOSURE

A circuit for operating one or more electric discharge lamps from an alternating current line with reduced inductive ballast, in which a gated two-way semiconductor is in series with a transformer and condenser, and another gated two-way semiconductor is across the series circuit of transformer and condenser. The lamp or lamps are in series with the secondary of the transformer, although they can be used in place of the transformer if the line voltage is sufficient for starting and operating them. A small inductance is preferably placed in series with the shunting semiconductor to insure that the shunting semiconductor unit will not be triggered until after the series unit is triggered. The triggering can be done by a voltage divider across each gated semiconductor, the divider including a resistance and condenser in series. A diode semiconductor can be in series with the gate of one or of each of the gated semiconductors.

---

This invention relates to circuits for starting and operating gaseous discharge devices, such as for example, fluorescent lamps and high pressure mercury vapor lamps.

Such devices usually have a so-called negative resistance and hence require a current-limiting device in series with them. This regulates the current flowing through the device, thereby preventing run-away of the current or extinguishing of the arc as a result of normal fluctuation in the supply of electric power. Previously, this current-regulating ballast has been primarily an inductance coil or a resistance, with or without a condenser, the leakage reactance of a transformer sometimes being used as the inductance. Ballasts of such types generally require a considerable amount of iron and copper to operate on the usual 60 cycle-per-second power line, and are accordingly expensive.

I have discovered that by the use of semiconductors as a major component of the ballast, the inductance needed can be kept to a minimum and the expense of the ballast greatly reduced. Actually, the inductance needed for the semiconductor circuit can be smaller than an ordinary spool of thread, and can generally be in the form of a small transformer.

By my invention, the semiconductors start the lamp and then quickly cut off the current, start it again until the power is shut off. In this way, the current can be limited in an effective manner.

As another way of viewing the operation, the semiconductor device can be considered as a frequency converter which changes the line frequency of about 60 cycles per second to a much higher frequency, say 1000 cycles per second, in the lamp circuit. A smaller inductive ballast is required at the higher frequency, since the reactance of a given inductor increases with frequency.

I have discovered that the use of a so-called triac semiconductor device in series with a small lamp transformer and condenser, with another triac in shunt to the transformer and condenser, is very effective as a ballast. The lamp transformer can include not only a main secondary for supplying the discharge current through the lamp, but also a pair of windings to supply voltage for heating the lamp cathodes. Additional lamps can be used in series with whatever additional heating windings are needed. The triac is an AC triode semiconductor switch as described, for example, in the booklet, "Triac Control for AC Power," No. 200.35 of General Electric Company Semiconductor Products Department. The triac is a gated semiconductor switch. The device has two-way construction, triggered by a third electrode. I have discovered that the third electrode can be activated through a so-called diac connected between the third electrode and the connection between a condenser and resistor shunted across the two main electrodes of the triac. A diac is an avalanche type two-electrode full-wave semiconductor switch described in the same booklet noted above.

In operation, the condenser being uncharged, the line voltage will appear across the triac, except for the drop across the lamp transformer, and trigger it to charge a condenser. When the condenser is charged to a certain energy the voltage across the shunt triac will be sufficient to trigger the triac, and discharge the condenser, completing the cycle, which will then be repeated until the power line is disconnected. This charging and discharging of the condenser limits the energy input to the lamp, since the condenser can only be charged to a value $E=CV^2$, where C is the capacity and V the voltage, E being the energy. There will be many such oscillations during each cycle of the 60 cycle-per-second input from the power line.

Other objects, features and advantages of the invention will be apparent from the following description, taken in connection with the accompanying drawings, in which the figure is a schematic drawing of a circuit embodying the invention.

In the figure, the fluorescent lamp 1 is operated from the power line 2, 3 which supplied the voltage. The lamp 1 has the usual sealed enclosing envelope 4 with a coiled filamentary electrode 5, 6 at each end. The voltage for the lamps is supplied by a small transformer 7 having an iron core 8, two secondary windings 9, 10 each connected to supply heating voltage to one of its coiled electrodes 5, 6, a main secondary winding 11 connected to supply voltage for the main discharge between one end 12 of cathode 6 and one end 13 of cathode 5, a primary coil 14 connected in series with a condenser 15.

A triac 16 is connected in shunt to the series circuit of the transformer primary 14 and condenser 15, and another triac 17 is connected in series with the line 2, between triac 16 and the line. A condenser 18 in series with a resistor 19 is connected across triac 17, the trigger electrode 20 of triac 17 being connected between condenser 18 and resistor 19 through the diac 21. Similarly, condenser 22 and resistor 23 are in shunt to triac 16, with diac 23 connected from between them to the trigger electrode 24 of triac 16.

Upon the application of voltage to the circuit, for example by closing line switch 25, there is no voltage across condenser 15, since it has not yet become charged. The line voltage will nearly all appear across triac 17, and part of it will be used, through condenser 18 and resistor 19, to trigger the triac 17, thereby connecting the transformer primary 14 and condenser 15 in series with the power line 23 thus charging the condenser and supplying energy to the lamp 1.

When the condenser 15 is charged to a voltage sufficient to trigger triac 16, condenser 15 discharges through transformer 14 and triac 16, supplying energy to the lamp 1 through transformer 14.

The energy supplied to the lamp will therefore have risen to a particular value but have been cut off before reaching an excessive value during the cycle. The whole process will be repeated over and over again at a frequency fixed by the time constants of the triggering circuits 18–21–19 and 22–24–23, and the remainder of the circuit. The circuit as a whole will act as a constant-current frequency converter.

Although only a single lamp 1 is shown in the figure, two or more lamps can be used in series. When the line voltage is sufficient for starting and operating the lamp, the transformer 7 can be omitted and the lamp 1 connected in place of it. In that case, a smaller transformer can be connected across the line 2, 3 or in some other convenient manner to supply heating voltage to the electrodes 5, 6. The small inductance 26, in series with triac 16, is helpful in insuring that the triac 16 will not be triggered until after triac 17 has been triggered.

For operation of a single 40-watt fluorescent lamp, I have found the triacs 16, 17 can be type SC–41–D, condenser 15 of about one microfarad, condensers 18 and 22 of about 0.033 microfarad and each resistor 19 and 23 of about 33,000 ohms each and the line voltage 110 watts. Lamp 1 was a 40-watt T12 fluorescent lamp. Transformer 7 has a primary 10 of 30 turns, a main secondary 11 of about 120 turns and about 10 turns in each electrode winding, all wound on a laminated toroidal core 8 of ¼ inch wide and ⅜ inch deep, the core having an outside diameter of 1½ inches. Since the figure is schematic, the shape of core 8 is not shown in it, but was, in the example given, toroidal. The diacs 21 and 23 can be of the type known as ST2X5.

A diac which passes current only above the point at which the triacs 16, 17 would be triggered, can be used in place of each of the combinations 17–18–19–21 and 16–23–22, if some means is used to provide a proper time constant.

The transformer 7 can, of course, be an auto-transformer, if desired.

Although a specific embodiment has been described above, various modifications therein will be evident to a worker skilled in the art without departing from the spirit and scope of the invention as set forth in the appended claims.

What I claim is:

1. A ballast circuit for operating an electrical discharge lamp from an alternating current source, said circuit comprising: a pair of input terminals for connection to said source, a first two-way semiconductor switch, a capacitor, and a load including said lamp connected in series across said input terminals; and a second two-way semiconductor switch connected in shunt across said capacitor and said load.

2. A circuit for operating at least one electric discharge lamp from an alternating source, said circuit comprising: a two-way semiconductor switch, a capacitor and a transformer primary in series, a second two-way semiconductor switch connected in shunt across said capacitor and transformer primary and in series with said first semiconductor switch, and a transformer secondary connected across at least one lamp.

3. A circuit as in claim 1 in which the first semiconductor switch is a gated switch with means to supply voltage to trigger the gate a predetermined time after application of a voltage to the circuit, and an inductor in series with said second semiconductor switch.

4. A circuit as in claim 2 in which the first semiconductor switch is a gated switch with means to apply voltage to trigger the gate a predetermined turn after application of a voltage to the circuit, and an inductor in series with said second semiconductor switch having an inductance greater than the inductance in series with said first semiconductor switch.

5. The circuit of claim 2, in which the transformer has additional secondaries connected to heat cathodes of the lamps when energized.

6. The circuit of claim 3 in which across each semiconductor switch is connected a condenser and resistor in series with each other, the gate of said switch being connected between the condenser and at least part of the resistor through a two-electrode full wave semiconductor switch.

References Cited

UNITED STATES PATENTS 3,163,782    12/1964    Ross _____ 307—88.5
3,240,991    3/1966    Moreland _____ 315—244

FOREIGN PATENTS 302,526    7/1962    France.

JOHN W. HUCKERT, *Primary Examiner.*

J. D. CRAIG, *Assistant Examiner.*